United States Patent

Douglas et al.

Patent Number: 6,013,222
Date of Patent: *Jan. 11, 2000

[54] METHOD OF PRODUCING SHEET MATERIAL INCORPORATING PARTICULATE MATTER

[75] Inventors: Malcolm F. Douglas, Swansea; Graham V. Jackson, Barwell, both of United Kingdom; Steven J. Lenius, Woodbury, Minn.

[73] Assignee: 3M Innovative Properties Company, St. Paul, Minn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/875,317

[22] PCT Filed: Nov. 22, 1996

[86] PCT No.: PCT/US96/18753

§ 371 Date: Jul. 25, 1997

§ 102(e) Date: Jul. 25, 1997

[87] PCT Pub. No.: WO97/21531

PCT Pub. Date: Jun. 19, 1997

[30] Foreign Application Priority Data

Dec. 8, 1995 [WO] WIPO ............... PCT/US95/16218

[51] Int. Cl.⁷ .................... B29C 49/04; B29C 70/60; B29C 70/64

[52] U.S. Cl. ............... 264/514; 264/171.1; 264/173.16; 264/171.26; 425/131.1; 425/326.1; 51/298

[58] Field of Search ................. 264/514, 171.1, 264/171.26, 173.16, 172.19; 425/131.1, 208, 209, 326.1; 428/95; 51/298, 293, 295

[56] References Cited

U.S. PATENT DOCUMENTS

| | | | |
|---|---|---|---|
| 2,328,998 | 9/1943 | Radford | 51/185 |
| 2,411,724 | 11/1946 | Hill | 51/293 |
| 2,712,987 | 7/1955 | Storrs et al. | 51/293 |
| 2,899,288 | 8/1959 | Barclay | 51/293 |
| 3,709,642 | 1/1973 | Stannard | 426/72 |
| 3,813,231 | 5/1974 | Gilbert et al. | 51/298 |
| 4,240,807 | 12/1980 | Kronzer | 51/295 |
| 4,302,409 | 11/1981 | Miller et al. | 264/45.9 |
| 4,379,806 | 4/1983 | Korpman | 428/354 |
| 4,419,014 | 12/1983 | Gale | 366/99 |
| 4,564,349 | 1/1986 | Brown | 425/207 |
| 4,603,073 | 7/1986 | Renalls et al. | 428/147 |
| 4,648,508 | 3/1987 | Neal et al. | 206/328 |
| 5,075,061 | 12/1991 | Howell | 264/171 |
| 5,318,603 | 6/1994 | Scheider et al. | 51/293 |
| 5,443,906 | 8/1995 | Pihl et al. | 428/370 |
| 5,491,025 | 2/1996 | Pihl et al. | 428/373 |
| 5,518,794 | 5/1996 | Barber, Jr. et al. | 428/95 |

FOREIGN PATENT DOCUMENTS

| | | |
|---|---|---|
| 776116 | 1/1968 | Canada . |
| 0 089 680 A2 | 9/1983 | European Pat. Off. . |
| 0 447 555 A1 | 9/1991 | European Pat. Off. . |
| 0 632 756 B1 | 1/1995 | European Pat. Off. . |
| 2 654 671 | 5/1991 | France . |
| 1 943 101 | 3/1971 | Germany . |
| 2 304 105 | 8/1974 | Germany . |
| 327268 | 3/1972 | U.S.S.R. . |
| 1 477 767 | 6/1977 | United Kingdom . |
| 2 268 748 | 1/1994 | United Kingdom . |

*Primary Examiner*—Jan H. Silbaugh
*Assistant Examiner*—Michael Poe
*Attorney, Agent, or Firm*—Paul W. Busse

[57] ABSTRACT

Sheet material which incorporates selected particulate is produced using a blown film die (1); polymer containing the selected particulate is supplied to the die inlet so that, when the polymer is extruded through the die and expanded to form a blown film (6), the selected particulate is incorporated in the blown film; and the selected particulate is added to a part only of the polymer supplied to the die, so that the particulate will be present in only a certain part, for example a surface, of the blown film and of sheet material produced from the blown film.

8 Claims, 5 Drawing Sheets

METHOD OF PRODUCING SHEET MATERIAL INCORPORATING PARTICULATE MATTER

FIELD OF THE INVENTION

The present invention relates to a method and apparatus for producing sheet material which incorporates particulate matter. In one aspect, the invention relates to a method and apparatus for producing abrasive sheet material.

BACKGROUND OF THE INVENTION

There are uses in many fields for sheet material with particular properties which result from the presence of particulate matter in and, specifically, at the surface of the sheet material. In particular, sheet materials with abrasive particles at the surface are available in the form of rolls or pre-cut sheets of sandpaper or in the form of abrasive discs and belts, and are used to provide anti-slip surfaces for walkways and similar locations. Also, for example, sheet materials with magnetizable particles at the surface are used as magnetic recording media; and sheet materials with reflective particles at the surface are used for pavement marking purposes and for signs. All of those sheet materials are typically produced by comparatively complex coating processes.

Abrasive sheet materials, for example, are conventionally produced by a coating process which typically involves the steps of applying an adhesive to a substrate; depositing abrasive grit particles on the adhesive (optionally using an electrostatic coater to orient the particles); drying and/or curing the adhesive; and, optionally, applying a size coating to anchor the grit particles more firmly in place. The coating process is comparatively slow because it involves multiple coating steps together with long drying and/or curing times, and careful control of the coating conditions is required to ensure the continuous output of an acceptable product. The process may involve the use of organic solvents, the disposal of which should be carefully controlled to reduce the risk of damage to the environment. Moreover, the process does not readily accommodate changes in the various coating materials when it is required to produce a different grade of product.

As an alternative to that process, it has been proposed to produce abrasive products by embedding abrasive grit in the softened surface of a substrate. U.S. Pat. No. 2,712,987 describes a process for making an abrasive belt, in which abrasive particles are distributed over the surface of a nylon substrate softened with a suitable solvent so that the particles become embedded, following which the solvent is dried. U.S. Pat. No. 2,899,288 describes a process for making an abrasive product, in which the upper surface of a thermoplastic backing sheet is softened by heating before abrasive material is spread over the surface and pressed into the sheet between rollers. U.S. Pat. No. 3,813,231 describes a process in which abrasive grit is distributed over the surface of a copolymer film which is then heated in a platen press to bond the grit to the film. U.S. Pat. No. 4,240,807 describes a process in which the substrate is paper coated with a heat-activatable binder which is softened by heating; abrasive grit is then distributed over, and allowed to sink into, the softened binder.

Polymer-based materials in the form of sheets are also known and can be produced simply and economically by extrusion, either through a blown film die or through a slot die. Slot dies can be used to produce comparatively thick cast films and also to coat a film onto a substrate. The extrudate from a slot die may be stretched in the longitudinal and transverse directions (tentered) to produce a film which is biaxially oriented. A blown film die is a ring die with a central passageway through which a required volume of air is admitted into the centre of the extruded polymer tube, causing the extruded tube to expand substantially to form a so-called "bubble". When the polymer has cooled, the expanded tube is collapsed and can then be cut to provide sheeting material of the required shape and size. A method and apparatus for producing blown film are described in, for example, U.S. Pat. No. 5,104,593.

It is known, when using both blown film dies and slot dies, to coextrude two or more polymeric materials simultaneously in a single die to form a multilayer sheet (see the "Encyclopaedia of Polymer Science and Technology", Volume 7, page 106 et seq., published in 1987 by John Wiley and Sons). Sheets produced in that way are typically used as packaging materials. In addition, it is known to use a blown film die to coextrude a polymeric backing layer and an adhesive coating to produce adhesive strips, as described for example in GB-A-1 553 881; U.S. Pat. Nos. 5,124,094; and 5,128,076. The use of a coextrusion process to produce a film base which is then coated with magnetizable particles to form a magnetic recording medium is described in U.S. Pat. No. 4,603,073. In that process, one of the extruded layers can include carbon black beads so that the film base will be opaque.

A process which involves the extrusion of a polyurethane material, an epoxy resin and an aggregate, to produce an anti-slip tread, is described in GB-A-2 268 748. It is also known to add a mineral, for example, calcium carbonate, as a reinforcement to a polymer which is to be extruded through a blown film die (see Ruiz and Bankole "Mineral Reinforcement of Linear-Low Density Polyethylene Film, Bags and Liners", conference proceedings of the Society of Plastics Engineers, 1992) or to add a pigment such as titanium dioxide (see Duchesne, Schreiber, Johnson and Blong "New Approaches to the Processing of Rutile-Filled Polyolefins", Polymer Engineering and Science, August 1990). JP-A-61 112633 refers to a process in which glass beads are injected into the interior of the expanded tube and the tube, when subsequently collapsed, is pressed between a pair of nip rollers to form a composite film.

SUMMARY OF THE INVENTION

The present invention provides a method of producing sheet material, comprising: (a) supplying composite material to an inlet of a blown film die; the composite material comprising polymer with selected particulate present in only a part thereof; (b) extruding the composite material through the die to form an extrudate; and (c) expanding the extrudate to form a blown film in which the selected particulate is present in only a part of the thickness of the film.

The composite material may comprise a core and a surrounding portion, one of which contains particulate. When the surrounding portion contains particulate, a blown film can be produced with particulate in the outer surface. The particulate may include, but not limited to, abrasive particles, frictional particles such as ceramic beads, glass beads and glass bubbles, magnetic particles, and/or decorative particles.

The present invention also provides apparatus for producing sheet material, comprising a blown film die having an inlet connected to receive polymer, and a source of selected particulate connected to add particulate to only a part of the polymer received at the die inlet whereby the selected particulate is present in only a part of the thickness of blown film produced by the die from the polymer.

BRIEF DESCRIPTION OF THE DRAWINGS

By way of example only, processes and apparatus in accordance with the invention will be described with reference to the accompanying drawings, in which.

DETAILED DESCRIPTION OF THE INVENTION

Figure 1:
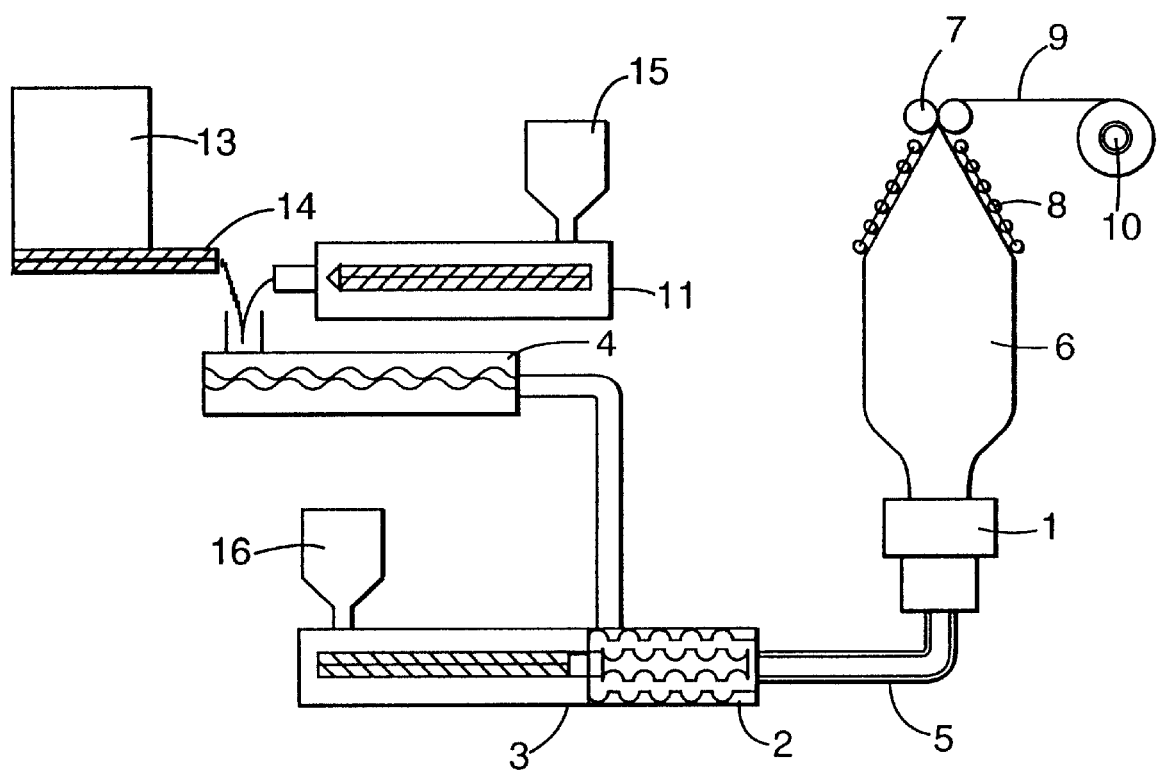
FIG. 1 is a diagram of apparatus for producing sheet material in accordance with the invention.

The apparatus shown in FIG. 1 comprises a blown film die 1 supplied by a hollow cavity transfer mixer (CTM) 2 which has a main input from a screw extruder 3 and an additional input from a pump 4. As will be described in greater detail below, the extruder 3 supplies molten polymer to the CTM 2 and the pump 4 supplies a mixture of molten polymer and particulate material. The output of the CTM 2, as will also be described below, is a core of molten polymer surrounded by an outer layer which comprises a mixture of molten polymer and particulate.

The CTM 2 is connected to the input of the blown film die 1 by a heated pipe 5. The material supplied to the die 1 is extruded, as will be described below, in the form of a "bubble" 6 of blown film which is pulled away from the die by nip rollers 7. Because the material supplied to the die 1 is in the form of a core of polymer surrounded by an outer portion comprising a mixture of polymer and particulate, the extrudate leaving the die 1 comprises an inner layer of polymer and an outer layer of a mixture of polymer and particulate, provided that no substantial degree of mixing takes place between the core and the outer portion as they pass through the die. As the extrudate is expanded to form a blown film, the particulate in the outer portion becomes increasingly exposed with some particles breaking through the surface of the film and other particles remaining covered by only a very thin layer of polymer. At a certain distance from the die 1, when the extrudate has cooled sufficiently, the "bubble" 6 is collapsed inside a guide frame 8 and is then passed through the nip rollers 7, so forming a flattened tube 9 which is wound onto a roll 10.

The CTM 2 and the blown film die 1 will both be described in greater detail below with reference to FIGS. 2 to 4. First, however, the manner in which material is supplied to the CTM will be described (still with reference to FIG. 1).

Solid polymer, typically in the form of pellets, is contained in the hopper 16 of the screw extruder 3 and also in the hopper 15 of a second screw extruder 11 and, in each case, the heat generated by the action of compression and shear forces as the polymer passes through the extruder causes the polymer to become molten. The molten polymer from the first extruder 3 is supplied directly to the CTM 2, as described above, while the molten polymer from the second extruder 11 is fed to the pump 4 which also receives particulate material from a hopper 13 via a screw feeder 14. The polymer and particulate are blended together in the pump 4 which may be a heated progressing cavity pump with a stator made from the material having the trade designation "Teflon" available from E.I. DuPont de Nemours of Wilmington, Del., U.S.A. Pumps of that type are available under the trade designation "Moyno" from Robbins & Myers Inc. of Springfield, Ohio, U.S.A. The pressure-generating capability of the pump is a function of the number of stages that it possesses.

Figure 2:
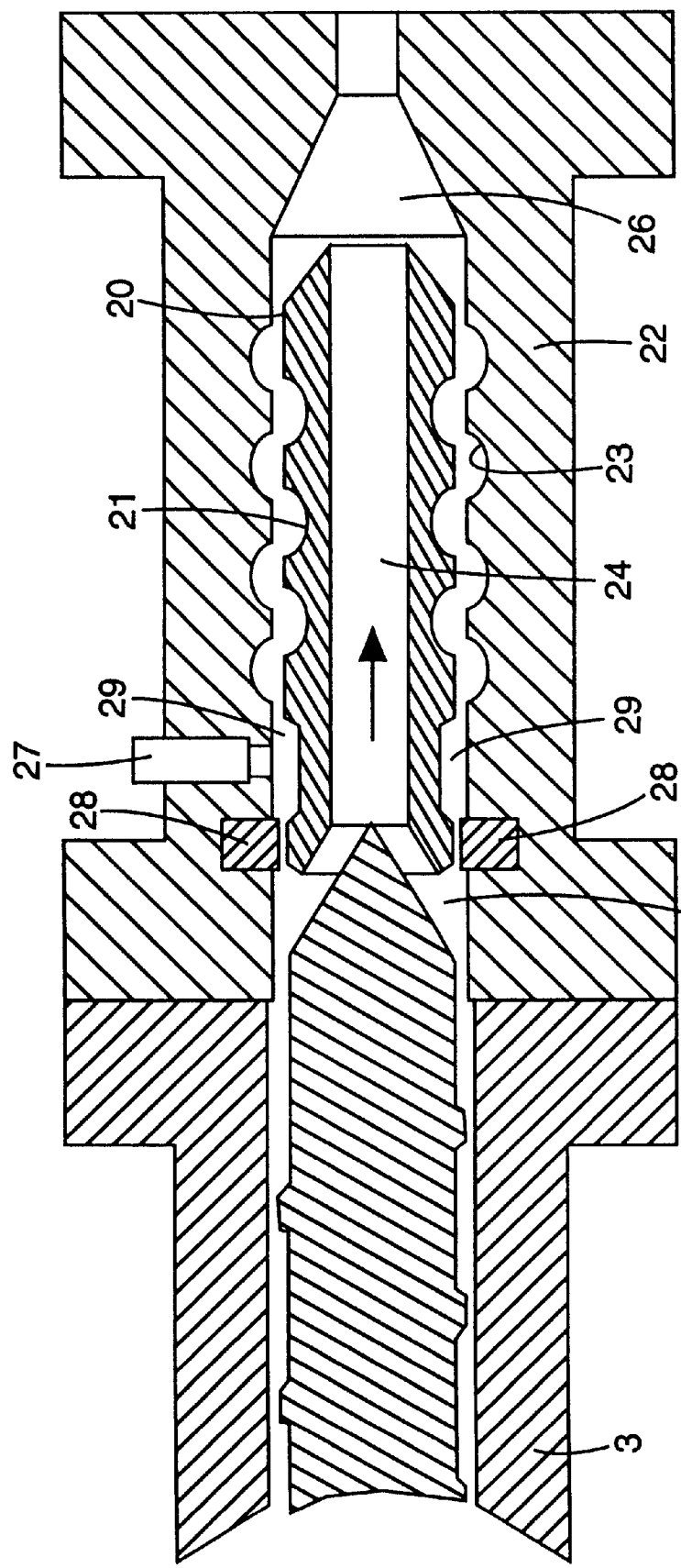
FIG. 2 is a diagrammatic longitudinal cross-section of a cavity transfer mixer used in the apparatus shown in FIG. 1.

The hollow CTM 2 is shown in greater detail, in longitudinal cross section, in FIG. 2. The mixer comprises a hollow central rotor 20, which has circumferential rows of recesses 21 in its outer surface, and a surrounding stator 22 which has circumferential rows of recesses 23 in its inner surface. The recesses 21, 23 are typically hemispherical in shape. On both the rotor and the stator, the recesses in adjacent circumferential rows are circumferentially offset from each other while the rows on the rotor are axially offset from the rows on the stator. In that way, a tortuous flow path 29 is established through the recesses 21, 23 between one end of the rotor and the other. The flow path 29 comprises a plurality of interconnections which change as the rotor turns within the stator to ensure thorough mixing of material flowing along the outside of the rotor. The hollow rotor 20 provides, in addition, a central flow path 24 which extends axially from one end of the rotor to the other. The central flow path 24 and the outer flow path 29 through the recesses 21, 23 on the outside of the rotor both communicate with a common inlet chamber 25 at the inlet end of the CTM 2 and with a common outlet chamber 26 at the outlet end of the CTM 2. The inlet chamber 25 and the outlet chamber 26 are connected respectively to the screw extruder 3 and to the blown film die 1 (FIG. 1). The output from the pump 4 enters the CTM 2 at an injector inlet 27 which communicates only with the outer flow path 29 on the outside of the rotor, on the upstream side of the recesses 21, 23.

The CTM 2 as shown in FIG. 2 functions as follows. Molten polymer from the extruder 3 is pushed into the inlet chamber 25 of the mixer and divides into two streams, a central stream which flows along the central flow path 24 and a smaller outer stream which flows along the outside of the rotor 20. Typically, the volume of polymer flowing along the outside of the rotor is about half the volume flowing through the centre of the rotor but that ratio can be adjusted by changing an adjustment ring 28 to alter the size of the openings between the outer flow path 29 and the chamber 25. At the injector inlet 27, the mixture of molten polymer and particulate from the pump 4 is added to the polymer flowing along the outside of the rotor and the two are mixed thoroughly together as they pass through the recesses 21, 23. The final mixture then enters the outlet chamber 26 of the CTM 2 where it surrounds the central stream, comprising polymer only, which emerges from the central flow path 24. The output of the mixer thus comprises a core of polymer surrounded by an outer portion comprising a mixture of polymer and particulate, as already described.

When using apparatus of the type shown in FIG. 1, the amounts of material delivered by the two extruders 3, 11 to the CTM 2 can be varied by changing the speeds of the extruders and, as explained above, the manner in which the polymer from the first extruder 3 is divided between the central and outer paths 24, 29 through the CTM can also be adjusted. The volume of polymer from the first extruder 3 that flows around the outside of the CTM rotor is generally within the range of from 20% to 70% of the volume that flows through the rotor, and is typically about 50% of that volume. The amount of particulate material that is supplied to the injector inlet of the CTM is generally within the range of from 20% to 40% by weight of the total amount of material flowing around the outside of the rotor and typically within the range of from 25% to 35% by weight. A cavity transfer mixer suitable for use in the apparatus of FIG. 1 is described in U.S. Pat. No. 4,419,014, incorporated herein by reference.

Figure 3:
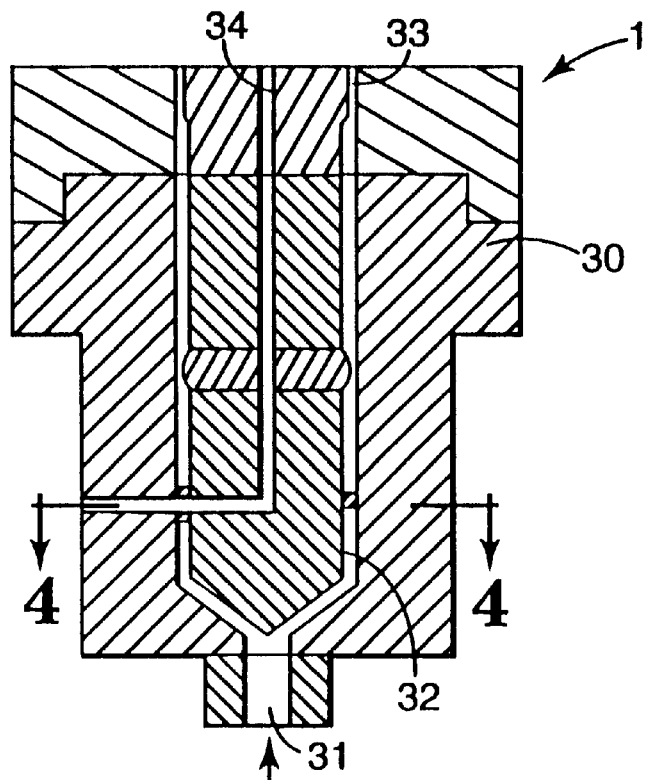
FIG. 3 is a diagrammatic longitudinal cross-section of a blown film die used in the apparatus shown in FIG. 1.
Figure 4:
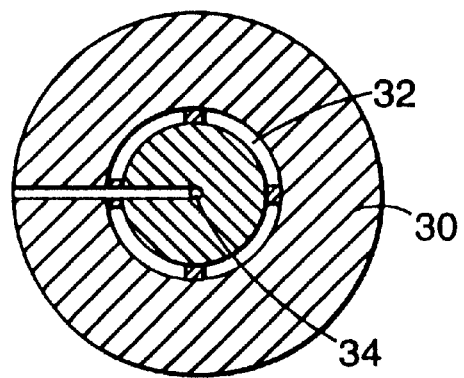
FIG. 4 is a cross-sectional view on the line IV—IV in FIG. 3.

The blown film die 1 is shown in greater detail in FIGS. 3 and 4 and comprises a cylindrical die head 30 with a central inlet 31 which opens out into an annular channel 32 leading to a ring die opening 33. Within the ring die is an air supply channel 34 through which air can be admitted into the centre of the tube of extrudate that emerges from the die opening 33. As already described, the extrudate is pulled away from the die by nip rollers 7 (FIG. 1) which also ensure that the air admitted by the supply channel 34 is contained within the tube of extrudate and causes the extrudate to expand as it leaves the die to form the "bubble" 6 of blown film. To assist in cooling the expanded film 6 before it is collapsed inside the guide frame 8, a second air channel (not shown) may be provided in the die 1 to direct air over the external surface of the extrudate as it leaves the die opening 33. Alternatively, the second air channel may be used to direct hot air over the extrudate so that it will stay soft over a greater distance from the die opening and can be stretched to a greater extent.

The diameter of the ring die opening 33 in the blown film die is typically about 50 mm and the width of the opening is about 1 mm, although those sizes may vary, depending on the die that is used. The diameter of the die may, for example, be as large as one meter while the width of the die opening is selected having regard to the desired thickness of the blown film, the nature of the polymer and the particle size of the particulate. The distance between the die opening 33 and the nip rollers 7 (FIG. 1) is typically about 800 mm, although that distance may vary, depending on the size of the die and the operating parameters.

Blown film dies of the type illustrated in FIGS. 3 and 4 are known and any suitable, commercially available, blown film die may be used in the apparatus shown in FIG. 1 provided that it does not cause any substantial mixing in the material passing from the central inlet 31 to the die opening 33. As already mentioned, it is important that the structure of the material supplied to the die by the CTM 2 (i.e. a core of polymer surrounded by an outer layer of a mixture of polymer and particulate) is not disturbed as the material passes through the die. One blown film die that can be used is available from Killion Extruders Inc. of Cedar Grove, N.J., U.S.A. Typically, a blown film die can expand the extrudate so that the transverse diameter of the bubble 6 is up to three or four times the diameter of the ring die opening 33. The thickness of the resulting blown film is dependent on the rate at which the extrudate is pulled away by the nip rollers 7 and is also dependent on the transverse diameter of the bubble 6 and hence on the volume of the contained air.

Figure 5:
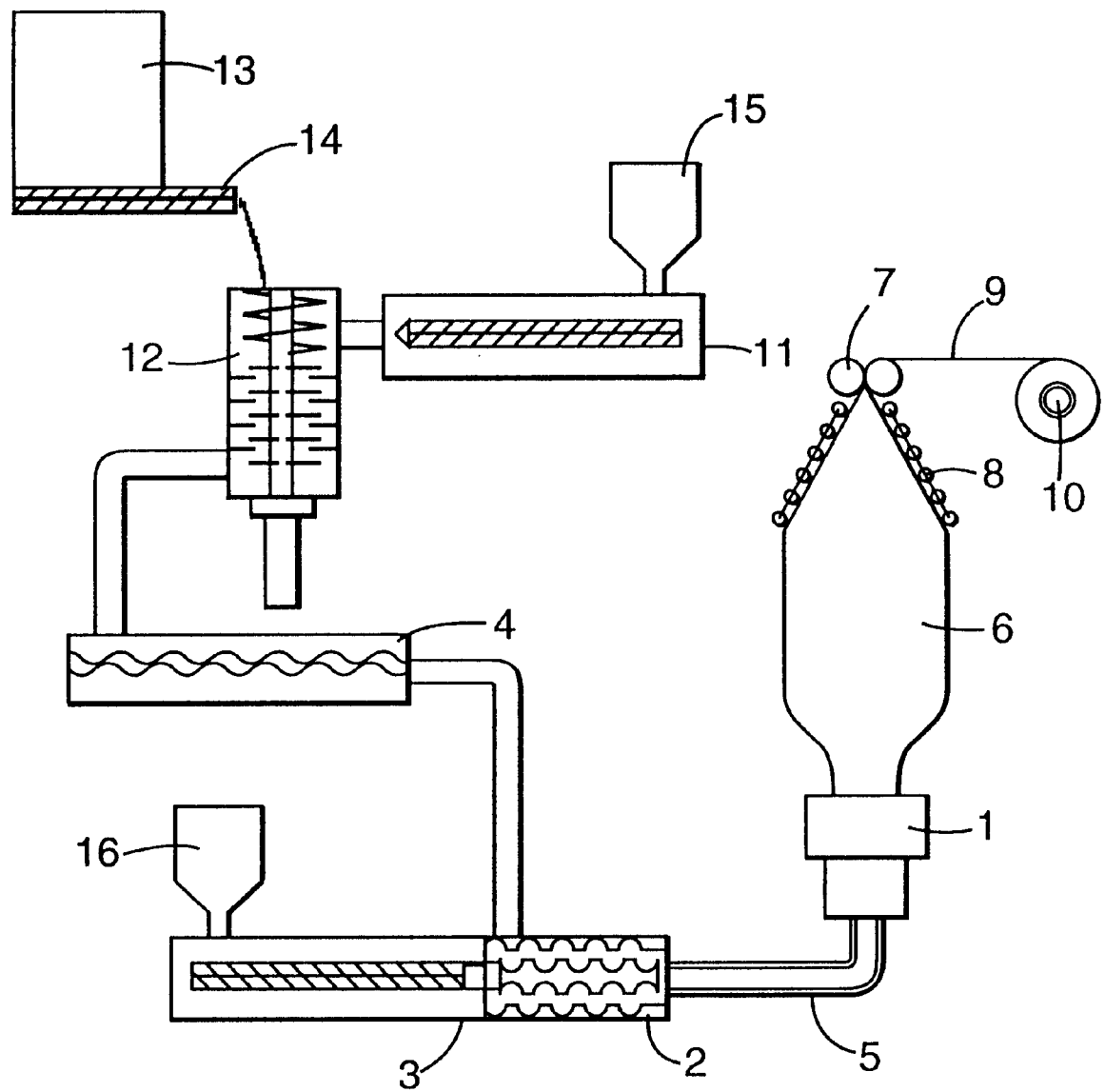
FIGS. 5 to 8 are diagrams of alternative forms of apparatus for producing sheet material in accordance with the invention.

FIG. 5 illustrates a modified form of the apparatus shown in FIG. 1, the modification residing in the provision of a pin mixer 12 which receives the polymer from the extruder 11 and the particulate from the screw feeder 14 and blends them together before they are fed to the pump 4.

Figure 6:
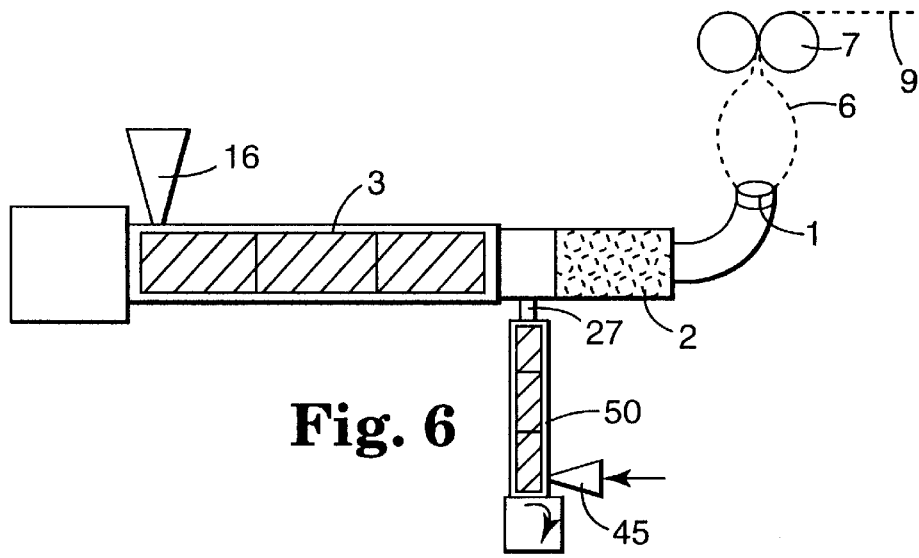

FIG. 6 illustrates another modified form of the apparatus shown in FIG. 1, the modification again residing in the manner in which the mixture of polymer and particulate is supplied to the CTM 2. In this case, instead of the progressing cavity pump 4, an extruder 50 is used to supply the mixture of polymer and particulate to the injector inlet 27 (FIG. 2) of the CTM, the mixture itself being formed on a two roll mill (not shown) and loaded into the hopper 45 of the extruder 50 in the form of small granules.

The extruders 3, 11, 50 used in the apparatus of FIGS. 1, 5 and 6 can be single screw or twin screw extruders, or any other equivalent extrusion machine. Generally, the operating temperatures and flow rates of the extruders will be dependent in part on the polymers and particulates employed. Apparatus of the type shown in FIG. 6 has been operated using polyethylene as the polymer in both extruders and with operating temperatures in the ranges of: from about 150° C. to about 190° C. at the first extruder 3 (supplying polymer only); from about 160° C. to about 230° C. at the second extruder 50 (supplying the mixture of polymer and particulate material); from about 160° C. to about 190° C. at the CTM 2 and from about 160° C. to about 180° C. at the blown film die 1. Typically, the capacities of the various components of the apparatus are such that the flow rate of material into the CTM 2 from the first extruder 3 is within the range of from 3.0 to 6.0 kg/hr and the flow rate of material into the CTM from the second extruder 50 is within the range of from 0.5 to 2.0 kg/hr.

Generally, when using apparatus of the type shown in FIG. 1, FIG. 5 or FIG. 6, the polymer supplied through the extruders may be any suitable extrudable thermoplastic polymer or mixtures thereof. It is not necessary for the same polymer to be supplied through both extruders. Polymers that are generally suitable include polypropylene, polyethylene, polycarbonates, polyetherimides, polyesters, polysulfones, polystyrenes, acrylonitrile-butadiene-styrene block copolymers, acetyl polymers, polyacrylates, polyvinyls and polyamides and combinations thereof. The polymer or polymers selected should have properties appropriate to the intended use of the blown film: for example, if the blown film is to be used for abrasive sheet material as described below, the polymer or polymers in the blown film extrudate should have a relatively-high melting temperature, heat and water resistance, and a degree of toughness appropriate to such a use.

Various additives can be included with the polymers, depending on the desired properties of the blown film. Those additives include, for example, coupling agents, reinforcers, toughening agents, polymer processing aids, plasticizers, fillers, stabilizers, UV absorbers and lubricants. The amounts of polymer additives used are selected to give the desired properties without adversely affecting the processing. The additives may be in particulate form but, in that case, are not to be equated with the selected particulate added to the CTM 2 through the injector inlet 27. If the polymer additives are present in the polymer in extruder 11 or 50 but not the polymer in extruder 3, they will also be present only in the outer surface of the blown film bubble 6. If, on the other hand, the polymer additives are present only in the polymer in extruder 3, they will be present throughout the blown film (although to a lesser extent in the outer surface).

The particulate that is used can be selected from a wide range of materials, provided that it will mix with a polymeric material, as described, and pass through the blown film die. Suitable particulates include, but are not limited to, abrasive particles, frictional particles such as ceramic beads, glass beads, and glass bubbles, magnetic ferrite particles, and decorative particles such as gold glitter. Depending on the nature of the particulate material, the blown film produced by the apparatus can have widely different properties and, consequently, widely different potential uses as will be described below.

A blown film having abrasive properties, which can be used to produce abrasive belts or sheets, or friction sheeting for use as a non-slip flooring material, can be produced by using abrasive grains as the particulate. The quality of the abrasive product is dependent on nature and sizes of the abrasive grains, the nature of the polymer and the extent to which the film is expanded as it leaves the blown film die.

The particle size of the abrasive particles in the blown film can range from about 0.1 to 1500 micrometers, typically from about 1 to 150 micrometers.

Examples of conventional abrasive particles, suitable for producing an abrasive product, include silicon carbide, alumina zirconia, and aluminum oxide (including sintered, sol gel, fused, and heat-treated aluminum oxide).

The abrasive product may contain a mixture of two or more different abrasive particles. This mixture may, for example, comprise a mixture of hard abrasive particles (i.e. particles having a Mohs hardness equal to, or greater than, 8) and soft abrasive particles (i.e. particles having a Mohs hardness less than 8) or a mixture of two soft or two hard abrasive particles.

The abrasive particles may have specific shapes associated with them. Examples of such shapes include rods, triangles, pyramids, cones, solid spheres and hollow spheres. Alternatively, the abrasive particles may be randomly shaped.

The abrasive particles can be treated to provide a surface coating thereon. A surface coating can be used to improve the adhesion between the abrasive particle and the polymer in the abrasive product. Alternatively, or in addition, a surface coating can alter and improve the abrading characteristics of the abrasive particles. The abrasive particle may have multiple coatings.

The abrasive particles may also be abrasive agglomerates. An abrasive agglomerate comprises a plurality of individual abrasive particles bonded together to form a shaped mass. The abrasive agglomerates may be irregularly or randomly shaped or have a predetermined shape such as rods, triangles, pyramids, cones, and solid spheres. The abrasive agglomerate may utilize an organic binder or an inorganic binder to bond the abrasive particles together. Examples of abrasive agglomerates are described in U.S. Pat. Nos. 4,652,275; 4,799,939; 5,500,273; and 5,549,962, incorporated herein by reference.

It has already been mentioned that the polymer material used in the apparatus of FIGS. 1 and 5 may comprise optional additives, such as coupling agents, reinforcers, toughening agents, polymer processing aids, plasticizers, fillers (which term includes grinding aids), stabilizers, UV absorbers and lubricants. Other optional additives include curing agents, expanding agents, fibers, initiators, suspending agents, photosensitizers, wetting agents, surfactants, dyes, and fire retardants. The amounts of these additives are selected to provide the properties desired.

In general, in the case of an abrasive sheet material, the addition of a plasticizer will increase the erodibility of the coating. The plasticizer should be compatible with the polymeric material of the blown film. Examples of plasticizers include polyvinyl chloride, dibutyl phthalate, alkyl benzyl phthalate, polyvinyl acetate, polyvinyl alcohol, cellulose esters, phthalate, silicone oils, adipate and sebacate esters, polyols, polyol derivatives, tricresyl phosphate and castor oil.

A filler generally has an average particle size ranging from 0.1 to 50 micrometers, typically from 1 to 30 micrometers. Examples of useful fillers for the polymer, in the case of an abrasive sheet material are calcium carbonate and silicate.

A grinding aid is defined as a material, the addition of which to an abrasive article has a significant effect on the chemical and physical processes of abrading and results in improved performance. It is believed in the art that a grinding aid will either 1) decrease the friction between the abrasive particles and the workpiece being abraded, 2) prevent the abrasive particle from "capping", i.e. prevent metal particles from becoming welded to the tops of the abrasive particles, 3) decrease the interface temperature between the abrasive particles the workpiece or 4) decrease the grinding forces. In general, the addition of a grinding aid increases the useful life of an abrasive product. Grinding aids encompass a wide variety of different materials and can be inorganic or organic based. Examples of grinding aids are cryolite and potassium tetrafluoroborate. A combination of different grinding aids may be used and, in some instances, this may produce a synergistic effect.

The addition of filler particles and/or grinding aid particles in some instances increases the erodibility of the resulting abrasive coating, which can be desirable.

A blown film incorporating abrasive particles, in accordance with the invention, may be collected as a tube as described with reference to FIG. 1 and then cut transversely to form seamless abrasive belts. Alternatively, the tube may be slit longitudinally and then cut or stamped into abrasive sheets or discs.

If required, a backing could be applied to an abrasive article produced from the blown film. The backing may be sealed or porous and may, for example, be cloth, polymeric film, fiber, metallic foil, a metal plate, paper, or a non-woven web. The backing may improve the strength or rigidity of the abrasive product, or provide a means of attaching the abrasive product to support means such as a back-up pad. More specifically, the backing may be a loop-type fabric or a sheet material with projecting hooking stems, either of which would enable the abrasive article to be secured to a back-up pad with a hook-and-loop type of attachment. Hook-and-loop attachment systems are described, for example, in U.S. Pat. Nos. 4,609,581 and 5,254,194, and in U.S. Pat. No. 5,505,747, all of which are incorporated herein by reference. Another form of backing is a non-woven or open-weave scrim which can be laminated to an abrasive article to impart strength and/or rigidity.

It is also possible to apply a coating to one side of an abrasive article produced from the blown films. The coating can be applied for various reasons; for example, a carbon black coating can be applied to the backing side of an article to reduce static charge generated during grinding; or a supersize coat, having a grinding aid such as $KBF_4$ can be applied to the abrasive side to increase cutting performance.

If required, a coating could be applied to the extrudate to produce a coated abrasive sheet. For example, a pressure sensitive adhesive could be extruded with the polymer using a multilayer feed block system such as that available from The Cloeren Company of Orange, Tex., U.S.A. to coat the inside surface of the extruded tube. The adhesive coating would then be expanded with the polymer and the resulting blown film would be slit into sheets before being collected. Representative examples of suitable pressure sensitive adhesives include latex crepe, rosin, acrylic polymers and copolymers e.g., polybutylacrylate, polyacrylate ester, vinyl ethers, e.g. polyvinyl n-butyl ether, alkyd adhesives, rubber adhesives, e.g. natural rubber, synthetic rubber, chlorinated rubber, and mixtures thereof. One preferred pressure sensitive adhesive is an isooctylacrylate: acrylic acid copolymer.

If required, a further polymer layer or layers could be extruded through the blown film die 1 with the output of the CTM 2, e.g., to form a backing on the inside of the blown film 6.

Figure 7:
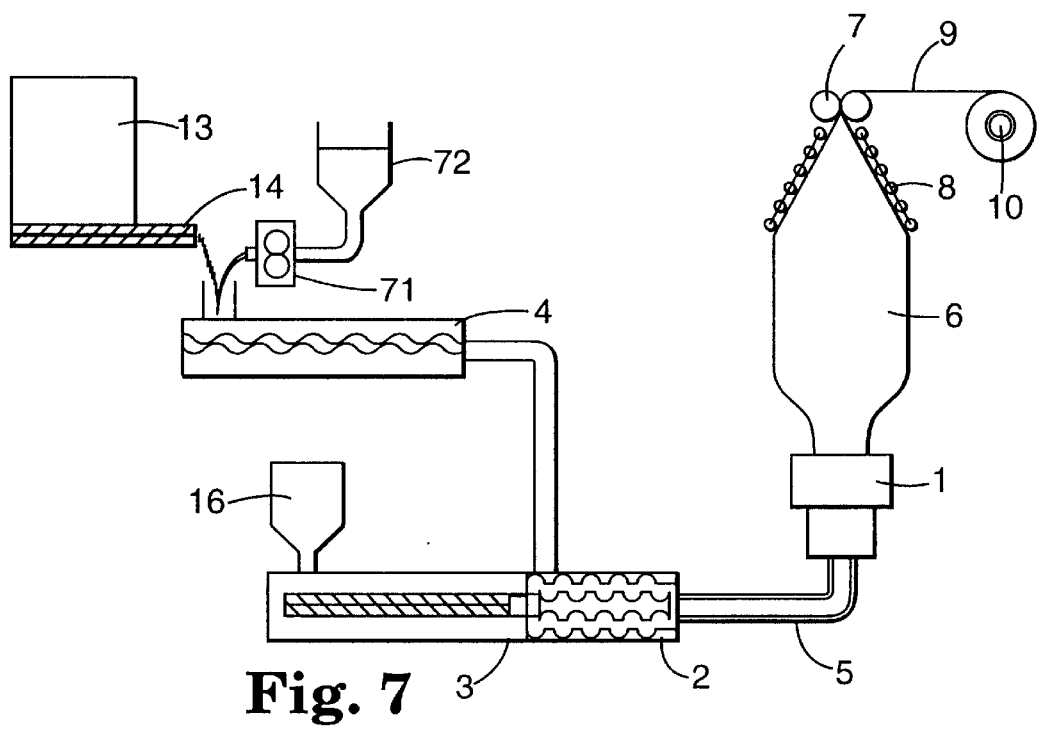
Figure 8:
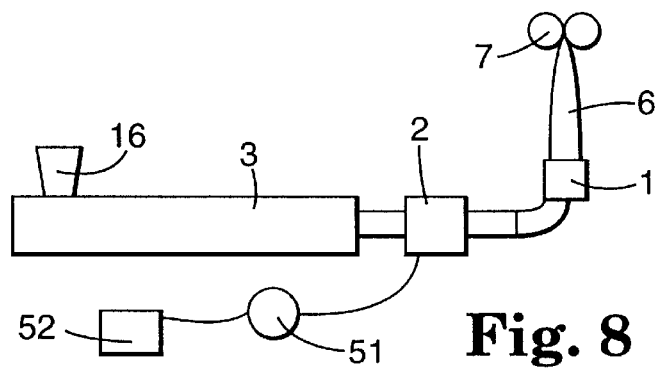

As described above, more than one type of particulate may be present in the mixture supplied to the CTM 2 (FIG. 1, 5 or 6) through the injector inlet 27, and different polymeric materials, or different blends of polymeric materials may be supplied to the CTM through the injector inlet 27 and from the hopper 16. In general, the particulate may be supplied to the CTM in a mixture with any suitable carrier material. For example, the particulate may be mixed with polypropylene when the material supplied to the CTM from the hopper 16 is polyethylene. As a further example, the particulate may be mixed with a liquid polymeric material when the material supplied to the CTM from the hopper 16 is a solid polymeric material. In the latter case, the apparatus for producing the blown film may be as shown in FIG. 7 or as shown in FIG. 8. The apparatus shown in FIG. 7 is generally similar to that shown in FIG. 1 except that the extruder 11 and associated hopper 15 are replaced by a pump 71 which receives liquid polymer from a container 72 and supplies the liquid polymer to the progressing cavity pump 4 where it is mixed with the particulate from hopper 13. The apparatus shown in FIG. 8 is generally similar to that shown in FIG. 6 except that the extruder 50 and associated hopper 45 are replaced by a pump 51 which receives, from a container 52, a slurry of particulate and liquid polymer. The pump 51 is connected to supply the slurry to the injector inlet 27 (FIG. 2) of the CTM 2. The pump 51 may, for example, be a 5 mm pneumatic pumping system available from Williams Instruments Company Inc. of Humble, Tex., U.S.A.

Although the apparatus shown in FIGS. 1 and 5 to 8 uses a hollow CTM 2 to provide the input to the blown film die, that is not essential. Any appropriate system could be used to provide an input to the blown film die 1 in the form of a composite material comprising a central core of polymeric material with a surrounding layer which comprises a mixture of polymeric material and particulate. For example, a CTM without a hollow rotor could be used simply to form the mixture of polymer and particulate, which could then be layered around the separately formed core of polymer material. The use of a hollow CTM 2 as described above does, however, have the effect of putting polymer from one source (i.e. the hopper 16) into both the central core and the surrounding layer and may avoid adhesion problems across the thickness of the blown film.

It is also not essential, when a CTM is employed, that the cavities 21, 23 in the rotor and stator, should be hemispherical as shown in FIG. 2: the cavities can have any shape that will achieve the desired mixing of polymer and particulate. It is also not essential for a mixture of polymer and particulate to be layered around a core of polymer at the outlet from the CTM 2. Instead, a polymer material could be layered around a core of a mixture of polymer and particulate with the result that the particulate would be on the inside of the blown film bubble 6. Alternatively, when a mixture of polymer and particulate is layered around a core of polymer, another layer, of polymer alone could be formed around the layer of the mixture. The blown film bubble from this assembly would have polymer inner and outer layers with a layer of polymer and particulate between them.

It will be appreciated from the above description that particulate is present in only a part of the thickness of the blown film. The location of the particulate in the film depends on the apparatus used. Apparatus and processes which enable particulate to be located in the exterior region or the interior region of a film have both been described. The percentage, by weight, of particulate in a film depends on several factors including, for example, the amount provided initially to the CTM 2.

The following Examples illustrate the use of abrasive particles as the particulate material in apparatus of the type shown in FIG. 6.

EXAMPLES

Examples 1

Using apparatus of the type shown in FIG. 6, a polymer melt comprising a medium density polyethylene ("MDPE") having a density of 940 kg/m$^3$, commercially available from British Petroleum Chemicals Limited, Middlesex, England under the trade designation "Novex", was supplied by a first extruder (similar to the extruder 3) to a CTM (similar to the CTM 2) at a rate of 115 g/min. The CTM was adjusted so that 62% of the melt passed along the central path through the CTM and 38% passed along the outside path. A mixture comprising 40% by weight of a low density polyethylene ("LDPE") having a density of 920 kg/m$^3$, commercially available from British Petroleum Chemicals Limited, Middlesex, England under the trade designation "Novex", and 60% by weight abrasive particles (fused aluminium oxide, Grade P320 (FEPA)) was supplied by a second extruder to the CTM through the injector inlet at a rate of 30 g/min. The temperature in the first extruder ranged from 150° C. at the input end to 160° C. at the output end; the temperature in the second extruder ranged from 185° C. at the input end to 215° C. at the output end; the temperature in the CTM was 165° C., and the temperature at the die opening of the blown film die was 170° C. The resulting blown film had an abrasive surface.

Example 2

The process described in Example 1 was followed except that the mixture of polymer and abrasive particles was supplied to the CTM at a rate of 51 g/min to yield a slightly higher concentration of abrasive particles in the blown film. In addition, the temperatures at the outlet ends of the first and second extruders and in the CTM were higher, at 175° C., 230° C. and 170° C. respectively.

Example 3

The process described in Example 1 was followed except that the abrasive particles used were Grade P100 (FEPA) and the mixture of polymer and abrasive particles was supplied to the CTM 2 at a rate of 48 g/min. The operating temperatures were as in Example 2.

Example 4

The process described in Example 1 was followed except that: the polymer melt was supplied by the first extruder to the CTM at a rate of 90 g/min; the abrasive particles used were Grade P100 (FEPA), and the mixture of polymer and abrasive particles was supplied to the CTM at a rate of 49 g/min. The operating temperatures were as in Example 2.

Samples 1 to 4, which were products of Example 1 to 4 respectively, were tested using the following test procedures as designated.

Test procedure A utilized a Coburn opthalmic lens grinding machine. Abrasive sheet material (cut into a daisy shape and mounted on a lap) was used in the machine to grind a plastic lens for a period of 90 seconds. The lens was then taken out of the machine and the caliper loss (i.e. the depth of material that had been removed from the centre of the lens) was measured. The surface finish of the lens was also evaluated by measuring, around a fixed circumference of the lens, the average peak-to-valley height (Ra) of the ridges remaining in the surface and the average peak-to-valley height (Rtm) of the five highest of those ridges.

Test procedure B utilized a Desoutter Model Auto 567 sanding machine. A 150 mm disk of abrasive sheet material, mounted on a back-up pad (available, under the trade designation "07317", from Minnesota Mining and Manufacturing Company of St. Paul, Minn., U.S.A.) was used in the machine, with an applied pressure of 25N, to abrade aged car primer paint (two-pack "Standox HS Füller"primer) on a flat steel panel. The weight loss, in grams, of the panel after periods of 1 minute and 2 minutes was measured.

Table 1 below shows the results obtained using Samples 1 and 2 as the abrasive sheet material in test procedure A:

TABLE 1

| Sample | Caliper loss (microns) | Ra (microns) | Rtm (microns) |
|---|---|---|---|
| Sample 1 | 260 | 45 | 296 |
| Sample 2 | 270 | 42 | 306 |

Table 2 below shows the results obtained using samples 3 and 4 as the abrasive sheet material in test procedure B:

TABLE 2

| Sample | Weight loss after 1 min. (g) | Weight loss after 2 min. (g) |
|---|---|---|
| Sample 3 | 0.87 | 1.28 |
| Sample 4 | 0.97 | 1.41 |

The results summarized in Tables 1 and 2 show that the samples 1 to 4 possessed abrasive properties.

Example 5

The process described in Example 1 was followed except that: the polymer melt was supplied by the first extruder to the CTM at a rate of 88 g/min; the CTM was adjusted so that two thirds of the melt passed along the central path through the CTM and one third passed along the outside path; the mixture supplied by the second extruder to the CTM comprised 25% by weight polymer (16% LDPE commercially available from British Petroleum Chemicals Ltd., Middlesex, England under the trade designation "Novex VS/55" and 9% polyethylene wax, available under the trade designation "AC-6" from Allied Signal of Morristown, N.J., U.S.A.) and 75% by weight ceramic beads, and the second extruder was set so that it would deliver polyethylene at a rate of 20 g/min. In addition, the temperature in the first extruder ranged from 159° C. at the input end to 185° C. at the output end; the temperature in the second extruder varied from 160° C. at the input end to 185° C. at the output end; the temperature in the CTM was 180° C. and the temperature at the die opening of the blown film die was 176° C. The resulting blown film showed ceramic beads in the outer surface.

Example 6

Examples 1 to 4 were repeated with the addition of a solid red pigment commercially available from Hubron Ltd., Manchester, England, under the trade designation "PEC 535" at a loading of about 1% by weight to the granules supplied to a second extruder. In each case, the outer layer of the resulting blown film was colored. The examples were then repeated with the color being added instead, at the same loading, to the polymer supplied to a first extruder. In each case, the inner layer of the resulting blown film was colored and the comparatively small amount of pigment present in the outer layer was not noticeable to the human eye. The addition of a pigment to one or both sides of the blown film in that manner provides a way of indicating, for example, the grade of the abrasive blown film material.

It was mentioned above that, by using other particulate materials instead of abrasive grains, sheet materials having other properties can be produced. For example, by using magnetic particles as the particulate material, a sheet material that exhibits a hysteresis curve can be produced. This type of material could then be used as a magnetic recording medium. By using glass beads or glass bubbles as the particulate material, a sheet material that reflects light can be produced. By using ceramic beads as the particulate material, a sheet material with a non-slip surface can be produced; this type of material could be used as a non-slip flooring material. Many other alternatives exist including, for example, the use of decorative particles to produce packaging material; the use of carbon black to produce a film which is electrically conductive on one surface; and the use of a pigment (as described in Example 6 but without the abrasive grains) to produce a colored film. Generally, it is possible to use any particulate material that will mix with a polymeric material and pass through the blown film die.

The following examples illustrate the use of some of those other particulate materials in apparatus of the type shown in FIG. 6 or FIG. 8.

Example 7

A polymer melt comprising a MDPE polymer having a density of 940 kg/m$^3$, commercially available from British Petroleum Chemicals Ltd., Middlesex, England, under the trade designation "Novex", was supplied by a first extruder (similar to the extruder 3) to a CTM (similar to the CTM 2) at a rate of 88.3 g/min and the inlet chamber of the CTM was adjusted so that approximately two thirds of the melt passed along the central path through the CTM and one third passed along the outside path. A mixture comprising 16% LDPE (commercially available from British Petroleum Chemicals Ltd., Middlesex, England, under the trade designation "Novex VS/55"), 9% polyethylene wax (commercially available from AlliedSignal, Morristown, N.J. under the trade designation "AC-6") and 75% ceramic beads as supplied to the CTM through the injector inlet. The resulting blown film showed ceramic beads in the outer surface.

Example 8

The process described in Example 7 was followed except that the mixture supplied to the CTM through the injector inlet comprised 55% LDPE (commercially available from British Petroleum Chemicals Ltd., Middlesex, England, under the trade designation "Novex VS/55"), 33% polyethylene wax (commercially available from AlliedSignal, Morristown, N.J. under the trade designation "AC-6") and 12% glass bubbles available from Minnesota Mining and Manufacturing Company, St. Paul, Minn. under the trade designation "38-4000"). The resulting blown film showed glass bubbles in the outer surface.

Example 9

The process described in Example 7 was followed except that the mixture supplied to the CTM through the injector inlet comprised 23% LDPE (commercially available from British Petroleum Chemicals Ltd., Middlesex, England, under the trade designation "Novex VS/55"), 9% polyethylene wax (commercially available from AlliedSignal, Morristown, N.J. under the trade designation "AC-6") and 68% glass beads. The resulting blown film showed glass beads in the outer surface.

Example 10

The process described in Example 7 was followed except that the mixture supplied to the CTM through the injector inlet comprised 63% LDPE commercially available from British Petroleum Chemicals Ltd., Middlesex, England, under the trade designation "Novex VS/55", 25% polyethylene wax (commercially available from AlliedSignal, Morristown, N.J. under the trade designation "AC-6") and 12% gold glitter particles. The resulting blown film showed glitter particles in the outer surface.

Example 11

The process described in Example 7 was followed except that the mixture supplied to the CTM through the injector inlet comprised 42% LDPE (commercially available from British Petroleum Chemicals Ltd., Middlesex, England, under the trade designation "Novex VS/55"), 16% polyethylene wax (commercially available from AlliedSignal, Morristown, N.J. under the trade designation "AC-6") and 42% magnetic ferrite particles. The resulting blown film showed magnetic ferrite particles in the outer surface.

It is also possible to produce a colored sheet material without using pigment throughout the whole thickness of the material, thereby enabling the cost to be reduced. For example, a pigment could be added to the mixture supplied to the CTM 2 through the injector inlet and/or to the material that passes along the central path in, for example, any of Examples 7 to 11 described herein. The resulting blown film will be colored on the side where the particulate material is located and/or on the other side. Other additives can, if desired, be included in the polymeric materials supplied to the cavity transfer mixer.

Example 12

Using apparatus of the type shown in FIG. 8, a polymer melt comprising a mixture of polypropylenes commercially available from Himont, Lisle, IL, under the trade designations "Moplen EPQ 30 RF" and "Adflex 7029 XCP" (60% "Moplen EPQ 30 RF" and 40% "Adflex 7029 XCP") was supplied by a first extruder (similar to the extruder 3) to a CTM (similar to the CTM 2) at a rate of 112.5 g/min. The CTM was adjusted so that 51.2% of the melt passed along the central path through the CTM and 48.8% passed along the outside part. A slurry comprising 50% magnetic ferrite particles in an extrusion carrier liquid (commercially available from Metacol Ltd., under the trade designation "EA 107") was supplied by a pump to the CTM through the injector inlet 12 (FIG. 1) at a rate of 43.7 g/min. The temperature in the first extruder ranged from 156° C. at the input end to 180° C. at the output end; the temperature in the CTM was 185° C. and the temperature at the die opening of the blown film die was 202° C. The resulting blown film showed magnetic ferrite particles in the outer surface.

The magnetic properties of a sample of blown film produced by the method of Example 12 were measured using a BH meter in a magnetic field of 3000 Oe ($\frac{3}{4}\pi \times 10^6$ Am$^{-1}$). The sample had a coercivity (Hc) of 768 Oe (0.768/ $4\pi \times 10^6$ Am$^{-1}$) and a squareness (Ør/Øm) of 0.69. Squareness is the ratio between the remanent saturation magnetization Ør and the saturation magnetization Øm of the sample and is a measure of the degree of orientation of the magnetic particles. For the purposes of comparison, video tape currently used in VHS cassettes typically has a coercivity of about 760 Oe and a squareness in the range 0.80 to 0.85.

Example 13

The process described in Example 12 was followed except that the polymer melt supplied by the first extruder to the CTM was an ethylene vinyl acetate copolymer (commercially available from E.I. DuPont de Nemours Company, Wilmington, Del., under the trade designation "Elvax 360") supplied to the CTM at a rate of 112.5 g/min.; the slurry supplied to the injector inlet of the CTM comprised 10% carbon black in a liquid extrusion carrier ("EA 107") and was supplied at a rate of 16.5 g/min. The temperature in the first extruder ranged from 145° C. at the input end to 162° C. at the output end. The temperature in the CTM was 160° C. The temperature of the die opening of the blown film die was 158° C. The resulting blown film showed carbon black in the outer surface.

Example 14

Using apparatus of the type shown in FIG. 6, an ethylene vinyl acetate copolymer melt which had a melt index of 0.5 and contained 12% vinyl acetate (commercially available from Quantum Chemical Corporation, Cincinnati, Ohio, under the trade designation "Quantum 657-000") was supplied by the first extruder to the CTM at a rate of 1 kg/hr and the CTM was adjusted so that 10% of the melt passed along the outside path and 90% passed along the central path. A mixture comprising a blend of 28% carbon black and 72% of an ethylene vinyl acetate copolymer which had a melt index of 5.5 and contained 12% vinyl acetate (commercially available from Quantum Chemical Corporation, Cincinnati, Ohio under the trade designation "Quantum UE 656-003") was supplied to the CTM through the injector inlet at a rate of 0.86 kg/hr. The temperatures in the first and second extruders ranged from 153° C. at the input ends to 177° C. at the output ends. The temperature of the CTM was 177° C. The temperature at the die opening of the blown film die was 177° C. The resulting blown film showed carbon black in the outer surface.

The surface resistivity of samples of blown film produced by the method of Example 14 was measured. The samples varied in thickness from 0.06 to 0.15 mm but in each case the carbon black was located in a region having a thickness of 55% of the film thickness. The surface resistivity of the inner (carbon black free) surfaces of the films ranged from $2 \times 10^{13}$ to $1 \times 10^{14}$ ohms/sq and the surface resistivity of the outer (carbon black containing) surfaces of the films ranged from $8 \times 10^3$ to $2 \times 10^4$ ohms/sq.

We claim:

1. A method of producing sheet material having abrasive particles retained in an outer surface thereof, the method comprising:

(a) supplying polymer to an inlet of a blown film die, and adding the abrasive particles to only a part of the polymer supplied to the die inlet to form a composite material comprising polymer with the abrasive particles present in only a part thereof;

(b) extruding the composite material through the die to form an extrudate having an inner portion of polymer without abrasive particles and an outer portion of a mixture of polymer and abrasive particles;

(c) expanding the extrudate to form a blown polymeric film in which the abrasive particles are present in only the outer portion of the thickness of the film wherein, as the extrudate is expanded to form the blown polymeric film, the abrasive particles in the outer portion become increasely exposed with some abrasive particles breaking through the outer surface of the film and other abrasive particles remaining covered by only a very thin layer of polymer.

2. A method as claimed in claim 1, including the step of applying a coating to at least one side of the extrudate.

3. A method as claimed in claim 1, including the step of applying a backing material to one side of the blown film.

4. A method as claimed in claim 1, comprising forming an inner stream and an outer stream of polymer, wherein the outer stream contains the abrasive particles, and surrounding the inner stream by the outer stream upstream of the die inlet.

5. A method as claimed in claim 4, in which the inner and outer streams are formed by dividing a main stream of polymer into a central stream corresponding to the inner stream and a surrounding stream corresponding to the outer stream and then adding the abrasive particles to the surrounding stream.

6. A method as claimed in claim 5, in which the abrasive particles are mixed with polymer before being added to the surrounding stream.

7. A method as claimed in claim 5, in which the abrasive particles are mixed into the surrounding stream of polymer in a cavity transfer mixer.

8. A method as claimed in claim 7, in which the central stream of polymer by-passes, or is fed directly through, the cavity transfer mixer.

* * * * *